S. B. Holden.
Churn.
N° 89,046.        Patented Apr. 20, 1869.
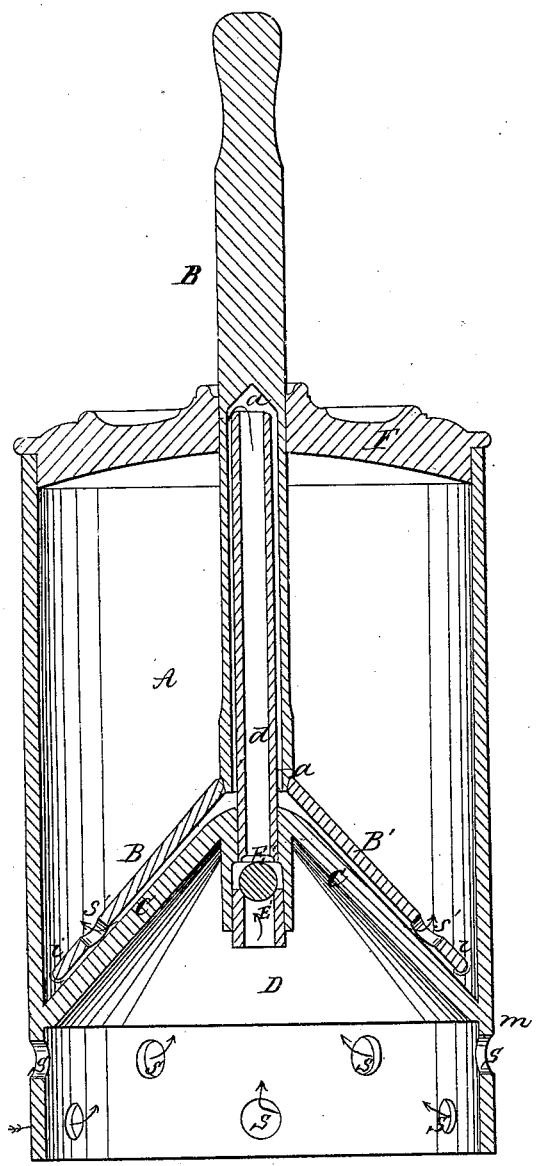
Witnesses,
J. S. G. Wilde.
G. E. Sanderson.
Inventor
Stoughton B. Holden
by
Carroll D. Wright Atty.

United States Patent Office.

STOUGHTON B. HOLDEN, OF WOBURN, ASSIGNOR TO HIMSELF AND LUTHER L. HOLDEN, OF BOSTON, MASSACHUSETTS.

*Letters Patent No. 89,046, dated April 20, 1869.*

---

IMPROVEMENT IN CHURNS.

---

The Schedule referred to in these Letters Patent and making part of the same.

---

*To all whom it may concern:*

Be it known that I, STOUGHTON B. HOLDEN, of Woburn, in the county of Middlesex, and State of Massachusetts, have invented certain Improvements in Churns; and do hereby declare the following to be a full, clear, and exact description thereof, reference being had to the accompanying drawings, which represent a vertical section of a churn, showing my improvements.

The object of my invention is to construct a churn, which, when being operated, shall be capable of introducing air into the cream, or milk, in the simplest and most effectual manner.

It is well known that cream, or milk contains globules, which are in reality the butter, and these globules must be broken before the butter can be separated from the buttermilk.

Now, the introduction of air materially assists in breaking these globules, and consequently, that construction which will accomplish this the best and simplest, is the most valuable.

Further, it is often desirable to cool or warm the cream, or milk in the churn, and my invention has for one of its objects the means for doing this while the churn is in operation.

The nature of my invention consists in admitting air through holes at the bottom of a churn-barrel, below the part which holds the cream, or milk. Then, through a valve and tube, so that the operation of the dash shall bring in the air, and also serve to introduce it through the cream, or milk.

In the drawings—

A is the barrel, having cover F.

B, the dasher-handle, having dash B'.

C is the bottom of the barrel, and is constructed in the form of the apex of a cone.

The dash-handle is a tube from *a* down.

Extending from the centre of the bottom of the churn, is tube *d*.

This tube *d* sets up into the hollow dash-handle, but sufficient space is left between tube *d* and the walls of the handle to allow of a free air-passage.

At the lower part of tube *d* is placed a ball-valve, E, or any valve may be used, or any number of valves, but the one shown illustrates my ideas.

The dasher B' is supplied with a number of holes, S' S'.

Below the points *m m*, the barrel is supplied with holes, *s s*, for the admission of air.

Now, the following is the operation of my improved churn:

The cream, or milk is placed in the barrel A, the dashers lifted, a vacuum is created in tube *d*, air passes in at E' to supply the vacuum. When the dash is pressed down the valve E closes, and the air contained in the tube *a a* is forced into the milk, or cream, under dash B', around edge *i* of B', and through holes S'. When the dash is again raised, a vacuum is again created, and operation described repeated.

If it is desired to warm the milk, or cream being churned, it is better to introduce warm air into it, and the construction described allows of placing hot water under the space D, so as to rarefy the air, or it may be heated by any other means practicable.

Also, sometimes the milk, or cream is too warm to make butter quickly, and then it is necessary to cool it. This is easily done by cooling the air as it passes into tube *d*, either by cold water, or ice in the space D, or by other means which would readily suggest themselves.

I am aware that air has been introduced into churns before, for the purpose I have described, but not in the manner I have set forth. But

What I claim as my invention, and desire to secure by Letters Patent, is—

The cone-shaped bottom, C, with corresponding form of dasher, B', perforated as shown at S', in combination with valve E and tube *d*, substantially as shown and described.

In testimony whereof, I have signed my name to this specification, in the presence of two subscribing witnesses.

STOUGHTON B. HOLDEN.

Witnesses:
  CARROLL D. WRIGHT,
  GEO. E. SANDERSON.